Sept. 28, 1965  R. C. MONTROSS  3,209,292
DEVICE FOR DETECTING THE PROXIMITY OF METAL OBJECTS
Filed Dec. 18, 1961

INVENTOR.
ROBERT C. MONTROSS
BY

United States Patent Office 3,209,292
Patented Sept. 28, 1965

3,209,292
DEVICE FOR DETECTING THE PROXIMITY OF METAL OBJECTS
Robert C. Montross, Mequon, Wis., assignor to Square D Company, Park Ridge, Ill., a corporation of Michigan
Filed Dec. 18, 1961, Ser. No. 160,006
7 Claims. (Cl. 336—96)

The present invention relates to proximity switches or metal detectors and is more particularly concerned with the constructional details of a metal detector or transducer which is insensitive to ambient temperature changes.

Transducers or metal detectors are employed in a wide variety of applications, among which are the use thereof in connection with conveyor systems wherein the detector is employed to sense the presence or absence of a metal part on a moving conveyor or in connection with automated machines wherein the detector is used to sense the position of a movable object connected with the machine. It is to be appreciated that metal detectors are frequently required to sense either magnetic or non-magnetic objects under an extreme range of ambient temperature variations, as for example, a detector is positioned adjacent a heated motor in direct sunlight on a hot summer day or it may be positioned in the path of moving outdoor air through an open door on a cold winter day. It has been found that the changes in the metal detector caused by the wide range of temperatures frequently causes the devices to malfunction by failure to properly indicate the metal object which is to be detected thereby.

The transducer or metal detector according to the present invention operates on the principle of flux disturbance to indicate the presence of a metallic object which may be either magnetic or non-magnetic in nature. When the metal object to be detected is moved near the sensing portion of the detector, a disturbance is created in the flux field which surrounds the sensing portion. This disturbance in turn causes the detector to generate a signal which can be used to achieve a control function as will be hereinafter explained.

It is an object of the present invention to provide a metal detector or transducer which is highly sensitive to the presence of metallic objects and is insensitive to ambient temperature changes.

A further object of the present invention is to provide a metal detector which has a physically and electrically symmetrical construction to eliminate the effects of ambient temperature changes on the detector.

Another object of the present invention is to provide a metal detector with a housing sleeve wherein a support is centrally mounted so a pair of identical magnetic cores may be adjustably spaced on opposite sides of the support and wherein a pair of identical coil assemblies may be equidistantly spaced on opposite sides of the support in position between the cores and inner surface of the sleeve.

Further objects and features of the invention will be readily apparent to those skilled in the art from the specification and appended drawings illustrating a preferred embodiment in which.

Figure 1:
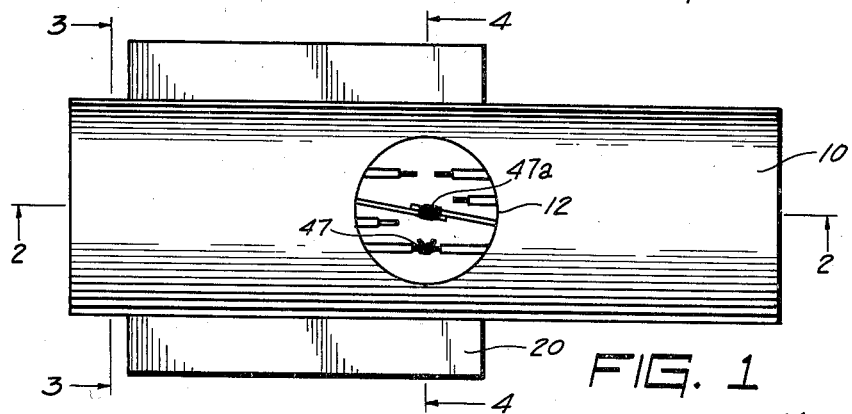
FIG. 1 is a top plan view of the metal detector according to the present invention.
Figure 3:
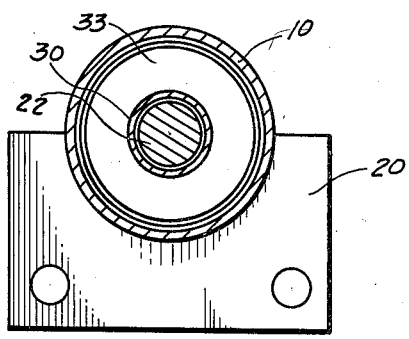
FIG. 3 is a cross sectional view taken along line 3—3 in FIG. 1.

In the drawings, and in FIG. 1 particularly, the metal detector or transducer shown can be used to sense either magnetic or non-magnetic materials, depending upon the type of flux which is generated by the metal detector. If the detector is supplied from a 60 cycle power source, the disturbing object should be magnetic in order to produce a maximum disturbance at a minimum air path flux level. If a higher frequency power source is used, i.e., 3000 cycles per second, the eddy current effect, which is increased proportionately as the square of the frequency, will produce a signal in response to a metallic, non-magnetic object.

The metal detector as will be hereinafter described possesses a sufficient degree of sensitivity to enable detection of a copper piece .010 thick, having a width of ¾" and a height of 1⅛" at a distance of ⅝" from the sensing surface of the metal detector and will produce a disturbance of 90 to 110 millivolts R.M.S. with the disturbing object at this distance. Further it has been found that other components which may be used with the metal detector, i.e., amplifiers, phase detectors and output circuits, require that a signal of 30 millivolts must be tolerated when no disturbing object is present in the sensing portion of the detector and that the metal detector must be stable under ambient temperature conditions which may range between 150° and 0° F.

In order to achieve the required stability the metal detector according to the present invention is both physically, magnetically, and electrically symmetrical about a common point, as will be hereinafter explained, so that any temperature change of the transducer will cause equal and opposite deviations of the components thereof so that the variations cancel each other and do not appear as an output signal.

Figure 2:
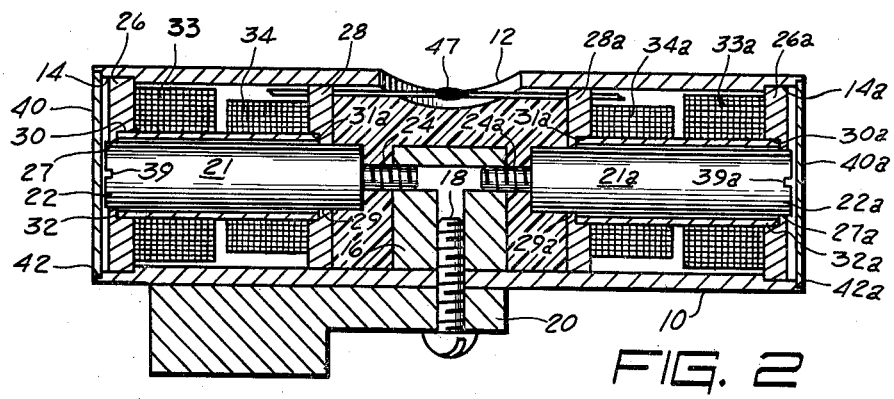
FIG. 2 is a cross sectional view taken along line 2—2 in FIG. 1.

The detector as shown in FIG. 2 is preferably provided with an outer sleeve 10 preferably formed of an insulating material. In this connection it is to be noted that if the sleeve 10 is formed of magnetic material the sensitivity of the device is reduced. The sleeve 10 is provided with an opening 12 at the central portion thereof, as most clearly shown in FIG. 1, and counterbores 14 and 14a at the opposite ends thereof, as shown in FIG. 2. A support 16 formed of non-magnetic insulating material is secured centrally within the sleeve 10 by means of a screw 18 which may be of either magnetic or non-magnetic material. The screw 18 may also secure a suitable non-metallic mounting means 20 for the detector. The support 16 is provided with a suitably threaded opening or passage which is located to have its center on the longitudinal axis of the sleeve 10 when the support 16 is secured therein.

Positioned on opposite sides of the support 16 within the interior of sleeve 10 are a pair of identical coil assemblies 21 and 21a which are identical physically and magnetically and are oppositely faced to each other. Because the assembly 21 is identical to assembly 21a, in the interest of brevity, only assembly 21 will be described. A suffix "a" to each of the components described in connection with coil assembly 21 will designate a corresponding component of coil assembly 21a.

The coil assembly 21 includes a magnetic core 22 which is spaced from the support 16 and adjustably mounted thereto by means of a non-magnetic metallic screw 24. The core 22 of assembly 21 and core 22a of assembly 21a are magnetically and physically identical; that is, they are preferably symmetrical in shape, of identical lengths and diameters, and are arranged to extend along the longitudinal axis of the sleeve 10. The cores 22 and 22a are formed of powdered metal which is compressed radially. In this connection it is to be noted that this method of compacting the cores is contrary to that normally employed in the manufacture of cores of the shape shown as normally cores would be formed by compressing the powdered metal longitudinally along the longitudinal axis of the core. It has been found that when the cores are formed by longitudinally compressing the material, a greater non-uniformity of the magnetic characteristics of the cores occurs.

The core 22 is positioned within the sleeve 10 by a pair of spaced washers 26 and 28 which are formed of non-metallic material. The washers 26 and 28 are respectively provided with a central opening 27 and 29, having a diameter to receive the core 22 with a minimum clearance. The outer diameter of the washer 26 is sized so that the washer 26 may be received in the counterbore 14. The outer diameter of the washer 28 is sized to be received within the inner walls of the sleeve 10. Each of the openings 27 and 29 are provided with a counterbore indicated by the numerals 30 and 31, respectively. The counterbores are of a diameter sufficient to tightly receive the outer walls of a sleeve 32 which has an inner diameter of sufficient size to provide an air gap clearance between the sleeve 32 and the core 22 when the parts are positioned, as in FIG. 2. Positioned on the sleeve 32 adjacent the washer 26 is a wound coil 33 and positioned on the sleeve 30 adjacent washer 28 is a wound coil 34. The coils 33 and 34 are wound upon the sleeve in a conventional manner through the use of universal coil winding construction which is similar to that presently employed in radio and television coil assemblies as is well known to those skilled in the art. It is well known also that a universally wound coil of the type described has a low distributed capacitance and possesses a uniform inductance. This arrangement, together with the presence of the air gap between the core 22 and the sleeve 32, reduces the non-symmetrical leakage and the effective capacitance between the windings themselves and the coils to ground.

Figure 4:
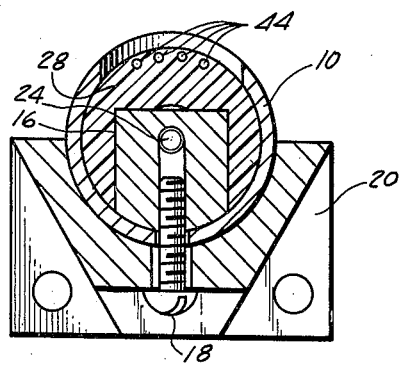
FIG. 4 is a cross sectional view taken along line 4—4 in FIG. 1.
Figure 5:
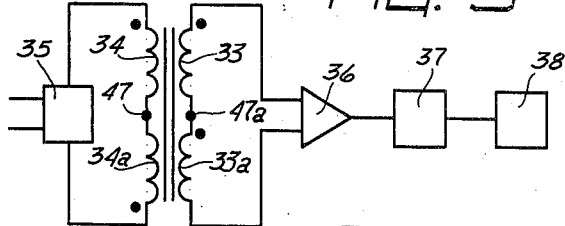
FIG. 5 is a schematic diagram of a circuit using the metal detector shown in FIG. 1.

In the preferred embodiment, as shown in FIG. 5, coils 34 and 34a are connected in series to a suitable source of alternating current 35 to act as driving coils for the metal detector. The coils 33 and 33a, which are located adjacent the sensing ends of the transducer, are connected in series to a suitable amplifier 36 having output leads connected to detector means 37 which in turn provides a signal to a suitable output circuit means indicated by numeral 38. The core 22 may be provided with a suitable slot 39 adjacent its outer end which is used to adjust the longitudinal position of the core relative to the support 16. If desired, the metal detector may be provided with a non-magnetic end cap 40 which is received in a siutable counterbore 42 in the sleeve 10, as shown. As shown in FIG. 5, each of the coils 33, 34, 33a and 34a are provided with a pair of leads. These leads preferably are threaded through suitably located openings in washers 28 and 28a and which openings are indicated by numeral 44 in FIG. 4. The series connection of the leads of coils 34, 34a, 33, and 33a, indicated by numerals 47 and 47a, are interconnected as shown in FIG. 5. The junctions may be accomplished by joining the leads within the interior of sleeve 10 by a soldered connection 47 and 47a, as shown in FIG. 1. The opening 12 in sleeve 10 permits the soldered connection to be established.

After the foregoing assembly is completed and the cores 21 and 21a are adjusted by means of slots 39 and 39a, respectively, so the output of the pickup coils 33 and 33a is zero in the absence of a metal object at the sensing end of the detector, the unit may be encapsulated with a suitable compound, such as an epoxy resin. The encapsulating material is introduced through opening 12 into the interior of sleeve 10 in the area between washers 28 and 28a and preferably will have its upper level at least concealing the cores 21 and 21a and the top of the support 16 so as to maintain the adjustment of the cores 21 and 21a.

As shown in FIG. 5, the driving coils 34 and 34a are series connected at a junction 47 and are energized from the source 35 with an alternating current to have a polarity in opposition to one another, as indicated by the dots adjacent the ends of the windings 34 and 34a. The pickup coils 33 and 33a are inductively coupled to the driving coils 34 and 34a to have voltages induced therein which have the proper polarity to produce voltage cancellation, also indicated by dots adjacent the ends of coils 33 and 33a. Consequently, when the flux linkages per conductor of one of the pickup coils exactly equals the flux linkages per conductor of the other pickup coil at a given instant in time, the induced voltages are equal and opposite and the net output to the amplifier 36 is zero. If a non-ferrous metal part is moved in the vicinity of one end of the transducer, the eddy currents induced in the non ferrous part from the 3,000 cycle frequency magnetic field by the driving coils 34 and 34a causes a disturbance of the flux field at that end. This flux disturbance changes the magnitude and phase of the induced voltage at the disturbed end so the voltages of the pickup coils 33 and 33a no longer cancel each other and a voltage is present at the detector output leads. This output voltage is amplified by amplifier 36 and supplied as an input to a detector means 37 as shown in FIG. 5. The detector means may either detect the magnitude or phase change of the output signal, or both, to provide an input signal to an output device 38 which in response to the input signal controls a suitable control device, such as a relay, a silicon controlled rectifier and the like, none of which are shown.

It has been found that the transducer will distinguish between ferrous metal objects and non-ferrous metal objects, if a phase discriminator is used, as the detector 37. A ferrous metal object will produce a disturbance to shift the output voltage phase in one direction with respect to the driving voltage. When a nonferrous metal object is placed adjacent the sensing end of the transducer, a phase shift of the output voltage signal occurs in the opposite direction. If a phase discriminator is employed, it will be able to thus distinguish between ferrous and nonferrous metals.

What is claimed is:

1. In a proximity detector transducer, the combination comprising; a sleeve, a support centrally positioned and immovally mounted within the sleeve, a pair of physically and magnetically identical magnetic cores adjustably connected to the support and equally spaced on opposite sides of the support and coaxially aligned within the sleeve and a pair of identical coil assemblies each immovably positioned by the sleeve and spaced equidistantly on opposite sides of the support and oppositely oriented within the sleeve adjacent the opposite ends thereof and each coaxially disposed between one of the cores and inner surface of the sleeve.

2. A temperature stable proximity transducer comprising; an insulating sleeve providing an outer housing for the transducer, said sleeve having a longitudinally centered opening therein, a support secured within the interior of the housing sleeve opposite the opening at the longitudinal center of the housing sleeve, a counter bore at each of the opposite ends of the housing sleeve, a pair of identical oppositely facing coil assemblies positioned in the interior of the housing sleeve adjacent the opposite ends thereof at equal distances from the support, each of said coil assemblies having; an insulating sleeve, a pair of spaced insulating washers of different diameters positioned by the sleeve, said washers diameters being arranged so the washer having the smaller diameter is received within the interior of the housing sleeve and the washer having the larger diameter is received in the counterbore, a pair of magnet coils having a different number of windings positioned on the sleeve between the washers so that when the coil assemblies are positioned in the housing sleeves the coils having the same number of windings will be proximate the support, and a pair of cylindrical magnetic cores identical in physical size and in magnetic characteristics adjustably secured to the support to be spaced equidistantly on opposite sides of the support and positioned in co-axial alignment within the housing sleeve by the washers of the coil assemblies.

3. The combination as recited in claim 2 wherein an air gap clearance is provided between the outer surface of the magnetic cores and the inner surface of the sleeve of the coil assembly.

4. The combination as recited in claim 2 wherein the cores are adjustably secured to the support by members having non-magnetic properties.

5. The combination as recited in claim 2 wherein leads from certain of the coils pass through the opening in the housing sleeve and a connection between other leads from the coil is accomplished through the opening.

6. The combination as recited in claim 2 wherein an encapsulating material is introduced through the opening after the support, magnetic cores and coil assemblies are positioned within the housing sleeve.

7. In a proximity detector transducer having a pair of magnetic cores identical in physical size and magnetic properties, a pair of physically and electrically identical magnetic coil assemblies each having a pair of spaced universally wound coils mounted on a tube and an outer housing sleeve having a support located at the longitudinal center of the sleeve and immovably mounted within the sleeve, a means positioned by the sleeve for mounting the respective coil assemblies at the respective ends of the sleeve for fixedly positioning the coil assemblies equidistantly on opposite sides of the support, and a non-magnetic means connecting the support with each of the cores for adjustably positioning the cores within the interior of the tubes equidistantly on opposite sides of support.

References Cited by the Examiner
UNITED STATES PATENTS

| Re. 18,889 | 7/33 | Sams et al. | 324—37 |
| 1,906,551 | 5/33 | DeForest | 324—34 X |
| 2,180,413 | 11/39 | Harvey | 336—131 X |
| 2,315,045 | 3/43 | Breitenstein | 324—41 X |
| 2,437,639 | 3/48 | Floyd | 324—34 |
| 2,862,192 | 11/58 | Golbert et al. | 336—96 |
| 2,915,699 | 12/59 | Mierendorf et al. | 324—41 |
| 2,942,178 | 6/60 | Nerwin | 324—40 |
| 3,075,144 | 1/63 | Cooper | 324—34 |

JOHN F. BURNS, *Primary Examiner.*

WALTER L. CARLSON, LARAMIE E. ASKIN,
*Examiners.*